(12) United States Patent
Levandowski

(10) Patent No.: US 6,634,133 B1
(45) Date of Patent: Oct. 21, 2003

(54) INFLATABLE DECOY SYSTEM

(76) Inventor: Patricia A. Levandowski, 511 Prospect Pl., Joliet, IL (US) 60436

(*) Notice: Subject to any disclaimer, the term of this patent is extended or adjusted under 35 U.S.C. 154(b) by 0 days.

(21) Appl. No.: 10/108,521

(22) Filed: Mar. 28, 2002

(51) Int. Cl.[7] .................................................. A01M 31/06
(52) U.S. Cl. ...................................................... 43/3; 43/2
(58) Field of Search ........................... 43/2, 3; 441/128, 441/129, 136; 114/351; 472/13; 446/220, 221, 223, 226; 5/945, 706, 710

(56) References Cited

U.S. PATENT DOCUMENTS

| | | | |
|---|---|---|---|
| 17,192 A | * 5/1857 | Bogle | 43/3 |
| 261,910 A | * 8/1882 | Cochel | 43/3 |
| 333,391 A | * 12/1885 | Casaday | 114/351 |
| 575,283 A | * 1/1897 | Frantz | 43/3 |
| 723,292 A | * 3/1903 | Metzger | 446/221 |
| 942,103 A | * 12/1909 | Rigney | 43/2 |
| 1,185,164 A | * 5/1916 | Batcher | 43/3 |
| 1,549,790 A | * 8/1925 | Neusella | 446/220 |
| 1,604,614 A | 10/1926 | Stoner | |
| 1,629,442 A | * 5/1927 | Geisinger | 43/3 |
| 1,801,961 A | 4/1931 | Hukill et al. | |
| 2,622,360 A | 12/1952 | Bertram | |
| 2,850,252 A | * 9/1958 | Ford | 441/129 |
| 3,358,398 A | * 12/1967 | Chalfin | 446/220 |
| 3,834,054 A | 9/1974 | Gentry et al. | |
| D268,862 S | 5/1983 | Fulster | |
| 4,454,615 A | * 6/1984 | Whitney | 5/706 |
| 4,607,447 A | * 8/1986 | Wright | 43/2 |
| 4,621,382 A | * 11/1986 | Burriss et al. | 441/129 |
| 4,651,457 A | 3/1987 | Nelson et al. | |
| 4,694,515 A | * 9/1987 | Rogers, Jr. | 5/706 |
| 4,722,105 A | * 2/1988 | Douglas | 5/710 |
| 4,753,028 A | 6/1988 | Farmer | |
| 4,773,178 A | 9/1988 | Marek | |
| 5,074,071 A | 12/1991 | Dunne | |
| 5,097,552 A | * 3/1992 | Viesturs | 5/706 |
| 5,265,293 A | * 11/1993 | Spahn et al. | 5/706 |
| 5,375,273 A | * 12/1994 | Bodine et al. | 5/710 |
| 5,533,217 A | * 7/1996 | Holdredge | 5/710 |
| 5,608,984 A | * 3/1997 | Shaffer | 43/3 |
| 5,632,055 A | * 5/1997 | Graf | 5/706 |
| 5,743,786 A | * 4/1998 | Lindsey | 446/221 |
| 5,745,941 A | * 5/1998 | Miller, Sr. | 5/710 |
| D394,895 S | 6/1998 | Moody | |
| 5,775,022 A | 7/1998 | Sumrall et al. | |
| 5,797,208 A | 8/1998 | Lessa | |
| 5,810,632 A | * 9/1998 | Huston, III | 441/129 |
| 5,991,949 A | * 11/1999 | Miller et al. | 5/710 |
| 6,240,584 B1 | * 6/2001 | Perez et al. | 5/710 |

\* cited by examiner

*Primary Examiner*—Darren W. Ark

(57) ABSTRACT

An inflatable decoy system for combining the ability of attracting fowl with the ease of use and storage. The inflatable decoy system includes an inflatable base member. The inflatable base member has a plurality of openings, which are coupled to a plurality of inflatable decoys. The plurality of inflatable decoys, each includes an opening couplable to an associated one of the plurality of openings of the base member. The associated openings in the base member and the associated openings in the decoys are coupled such that an interior of each the inflatable decoys is in environmental communication with an interior of the base member. Thus, each of the inflatable decoys is inflated when the base member is inflated. An inflation port in the base member facilitates the inflation of the base member and the plurality of decoys.

1 Claim, 6 Drawing Sheets

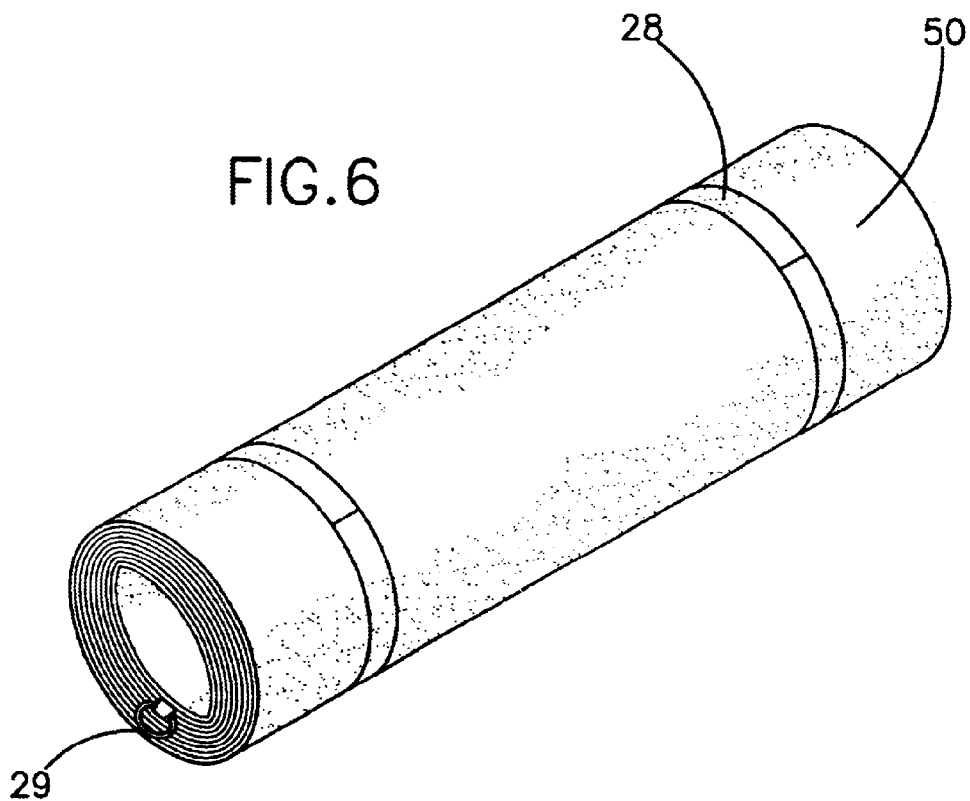

INFLATABLE DECOY SYSTEM

BACKGROUND OF THE INVENTION

1. Field of the Invention

The present invention relates to decoys and more particularly pertains to a new inflatable decoy system for combining the ability of attracting fowl with the ease of use and storage.

2. Description of the Prior Art

The use of decoys is known in the prior art. More specifically, decoys heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,604,614; U.S. Pat. No. 1,801,961; U.S. Pat. No. Des. 268,862; U.S. Pat. No. 2,622,360; U.S. Pat. No. Des. 394,895; U.S. Pat. No. 3,834,054; U.S. Pat. No. 4,651,457; U.S. Pat. No. 4,753,028; U.S. Pat. No. 4,773,178; U.S. Pat. No. 5,074,071; U.S. Pat. No. 5,775,022; and U.S. Pat. No. 5,797,208.

While these devices fulfill their respective, particular objectives and requirements, the aforementioned patents do not disclose a new inflatable decoy system. The inventive device includes an inflatable decoy system adapted for use on land or in marshes. The inflatable decoy system includes an inflatable base member. The inflatable base member has a plurality of openings, which are coupled to a plurality of inflatable decoys.

Each of the inflatable decoys includes an opening couplable to an associated one of the plurality of openings of the base member. The associated openings in the base member and the associated openings in the decoys are coupled such that an interior of each the inflatable decoys is in environmental communication with an interior of the base member. Thus, each of the inflatable decoys is inflated when the base member is inflated. An inflation port in the base member facilitates the inflation of the base member and the plurality of decoys.

In these respects, the inflatable decoy system according to the present invention substantially departs from the conventional concepts and designs of the prior art, and in so doing provides an apparatus primarily developed for the purpose of combining the ability of attracting fowl with the ease of use and storage.

SUMMARY OF THE INVENTION

In view of the foregoing disadvantages inherent in the known types of decoys now present in the prior art, the present invention provides a new inflatable decoy system construction wherein the same can be utilized for combining the ability of attracting fowl with the ease of use and storage.

The general purpose of the present invention, which will be described subsequently in greater detail, is to provide a new inflatable decoy system apparatus and method which has many of the advantages of the decoys mentioned heretofore and many novel features that result in a new inflatable decoy system which is not anticipated, rendered obvious, suggested, or even implied by any of the prior art decoys, either alone or in any combination thereof.

To attain this, the present invention generally comprises an inflatable decoy system adapted for use on land or in marshes. The inflatable decoy system includes an inflatable base member. The inflatable base member has a plurality of openings that are coupled to a plurality of inflatable decoys.

The plurality of inflatable decoys, each includes an opening couplable to an associated one of the plurality of openings of the base member. The associated openings in the base member and the associated openings in the decoys are coupled such that an interior of each the inflatable decoys is in environmental communication with an interior of the base member. Thus, each the inflatable decoys is inflated when the base member is inflated. An inflation port in the base member facilitates the inflation of the base member and the plurality of decoys.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new inflatable decoy system apparatus and method which has many of the advantages of the decoys mentioned heretofore and many novel features that result in a new inflatable decoy system which is not anticipated, rendered obvious, suggested, or even implied by any of the prior art decoys, either alone or in any combination thereof.

It is another object of the present invention to provide a new inflatable decoy system which may be easily and efficiently manufactured and marketed.

It is a further object of the present invention to provide a new inflatable decoy system which is of a durable and reliable construction.

An even further object of the present invention is to provide a new inflatable decoy system which is susceptible of a low cost of manufacture with regard to both materials and labor, and which accordingly is then susceptible of low prices of sale to the consuming public, thereby making such inflatable decoy system economically available to the buying public.

Still yet another object of the present invention is to provide a new inflatable decoy system which provides in the apparatuses and methods of the prior art some of the advantages thereof, while simultaneously overcoming some of the disadvantages normally associated therewith.

Still another object of the present invention is to provide a new inflatable decoy system for combining the ability of attracting fowl with the ease of use and storage.

Yet another object of the present invention is to provide a new inflatable decoy system which includes an inflatable base member. The inflatable base member has a plurality of openings which are coupled to a plurality of inflatable decoys.

The plurality of inflatable decoys, each includes an opening couplable to an associated one of the plurality of openings of the base member. The associated openings in the base member and the associated openings in the decoys are coupled such that an interior of each the inflatable decoys is in environmental communication with an interior of the base member. Thus, each of the inflatable decoys is inflated when the base member is inflated. An inflation port in the base member facilitates the inflation of the base member and the plurality of decoys.

Still yet another object of the present invention is to provide a new inflatable decoy system that allows numerous decoys to be deployed in a single step. It is another objective of the present invention to provide a new inflatable decoy system that allows numerous decoys to be inflated at a single time.

Even still another objective of the present invention is to provide a new inflatable decoy system that utilizes a coupling mechanism that allows alternative decoys to be removed and inserted without the loss of air.

Yet still even another object of the present invention is to provide a new inflatable decoy system in which decoys are easily replaced in the event of damage to a decoy or to permit mixing and matching of types of decoys, such as a combination of duck and geese decoys.

A further objective of the present invention is to provide a new inflatable decoy system that does not rely on any other means of interaction, such as wind, water, waves, or motors to attract fowl.

A still further objective of the present invention is to provide a new inflatable decoy system that is made of a flexible material, such as vinyl, that allows a hunter to inflate the system into the shapes of various fowl. Additionally, the flexible material allows a hunter to deflate and roll-up the system to provide an easier means of transporting and storing the new inflatable decoy system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a perspective view of the present invention deflated and rolled up for storage.

DESCRIPTION OF THE PREFERRED EMBODIMENT

Figure 1:
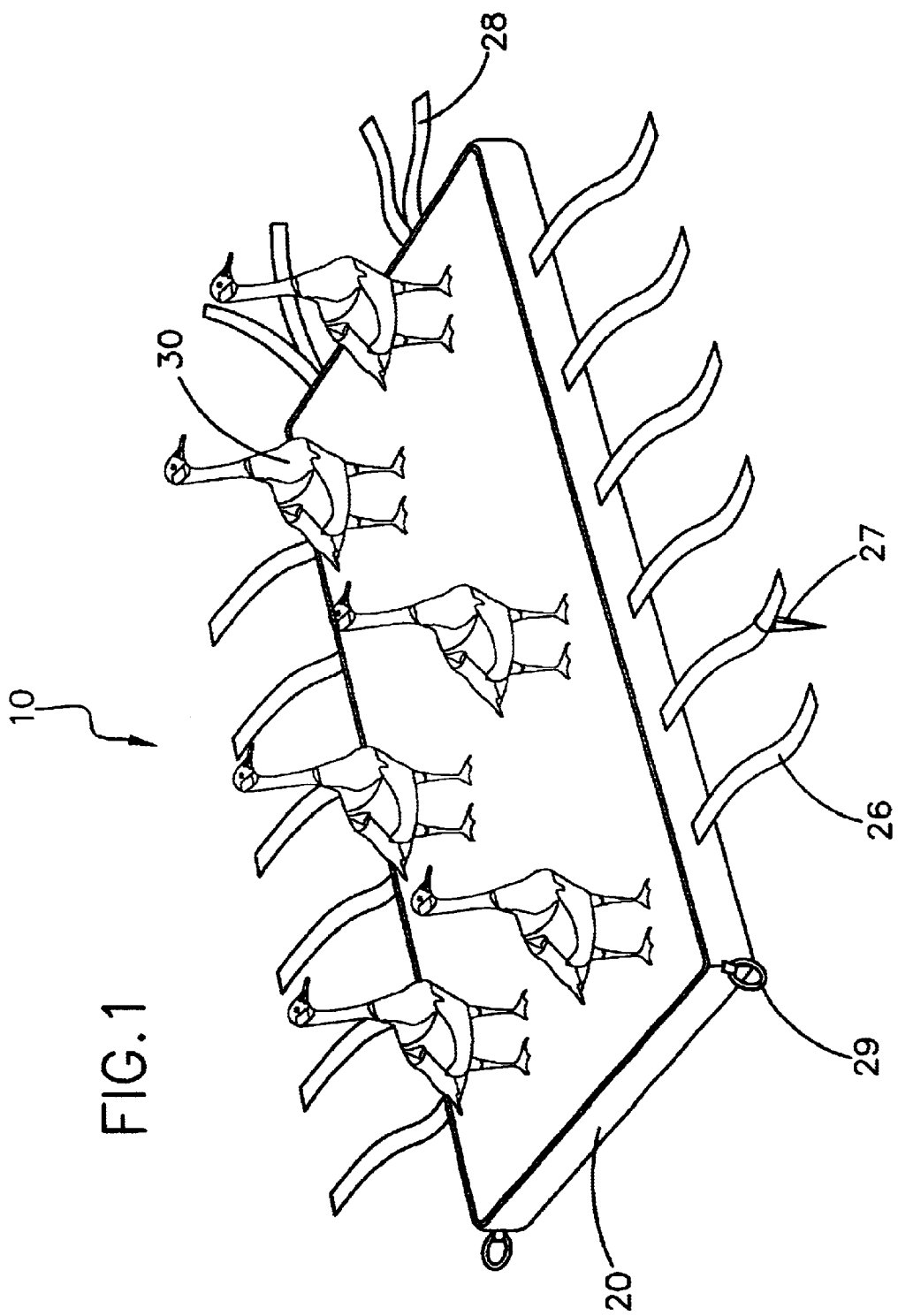
FIG. 1 is a perspective view of a new inflatable decoy system according to the present invention.
Figure 2:
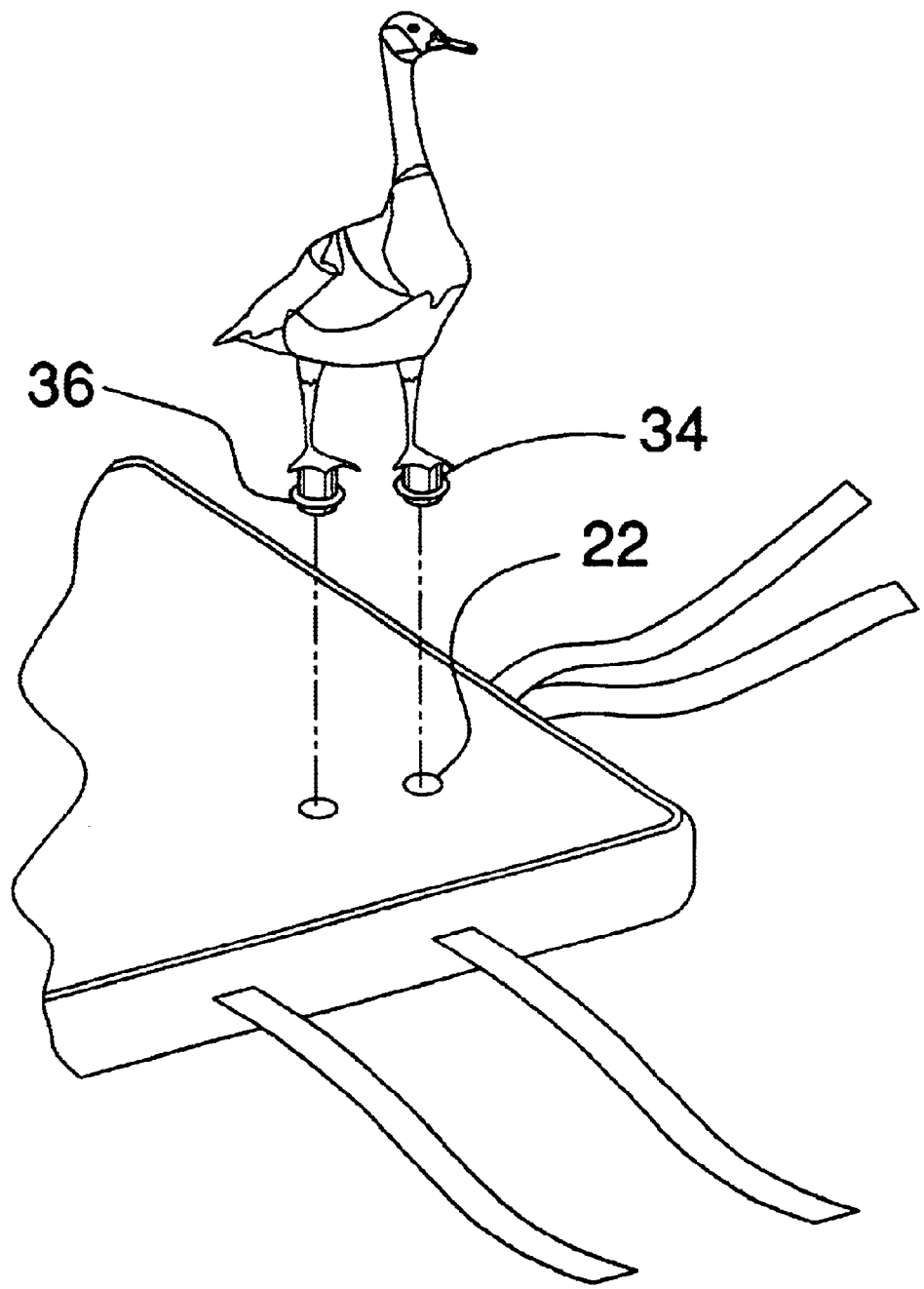
FIG. 2 is a perspective view of the present invention prior to assembling the decoys into the inflatable base.
Figure 3:
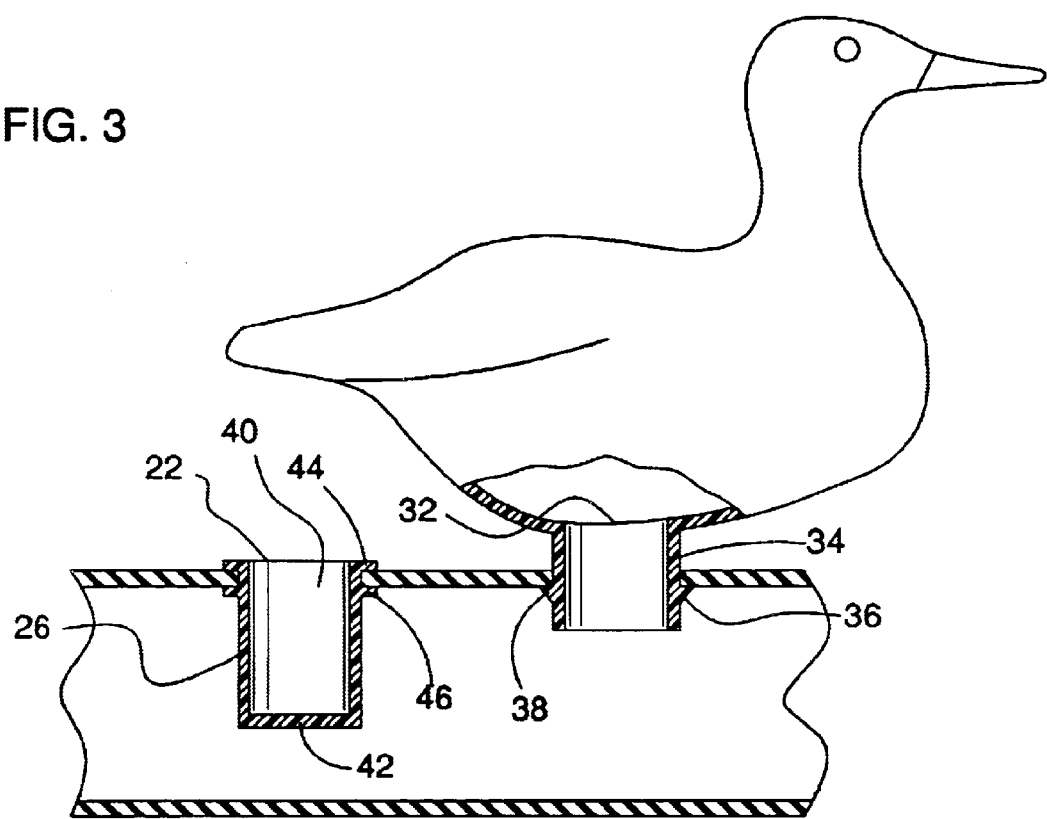
FIG. 3 is a partial cut-away view of the present invention showing the connection of the inflatable decoys to the inflatable base member
Figure 4:
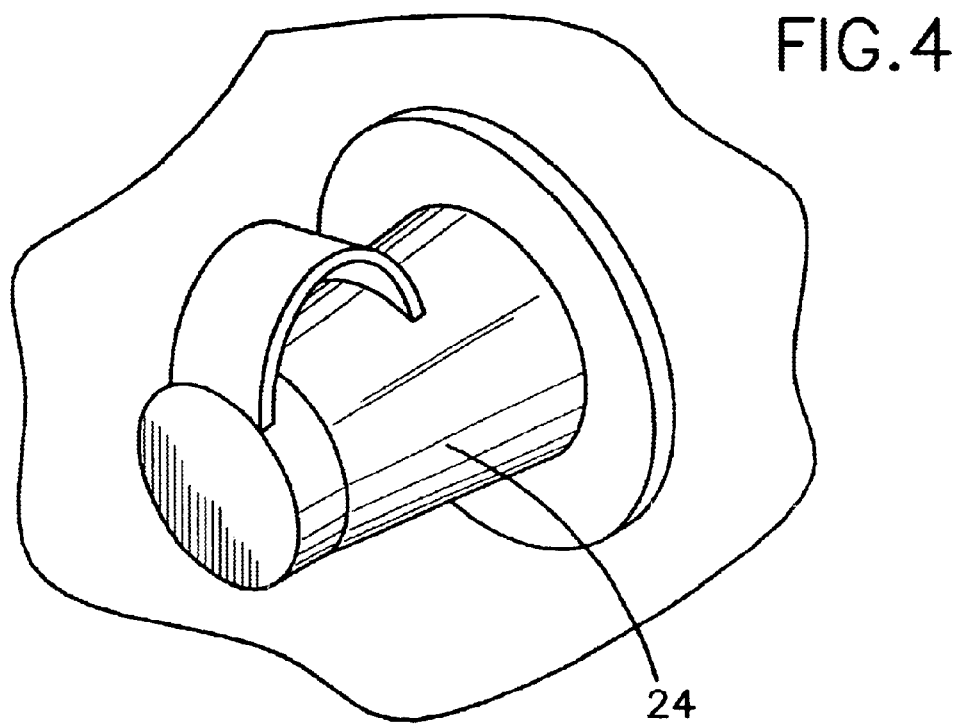
FIG. 4 is a perspective view of the inflation valve of the present invention.

With reference now to the drawings, and in particular to FIGS. 1 through 6 thereof, a new inflatable decoy system embodying the principles and concepts of the present invention and generally designated by the reference numeral 10 will be described.

As best illustrated in FIGS. 1 through 6, the inflatable decoy system 10 generally comprises a base member 20 which is inflatable. The base member generally includes a plurality of openings 22 which are couplable to a plurality of inflatable decoys 30. Each of the inflatable decoys includes a decoy opening 32 couplable to an associated one of the plurality of openings of the base member such that an interior of each the inflatable decoy is in environmental communication with an interior of the base member. Thus, each of the inflatable decoys is inflated when the base member is inflated.

The base member also includes an inflation port 24 for facilitating inflation of the base member and the associated decoys. The base member further includes a plurality of plug members 40. Each of the plug members is couplable to a selectable one of the plurality of openings in the base member. The plug member permits the inflation of the base member when the associated inflatable decoy is disengaged from the selectable one of the plurality of openings in the base member.

The plug members are generally cylindrical with a closed bottom 42 and an open top. The plug members generally include a first lip 44 extending outwardly from a top of the plug member and a second lip 46 positioned substantially parallel to the first lip. The second lip is in spaced relationship to the first lip such that a perimeter edge of the selectable one of the plurality of openings is insertable between the first lip and the second lip. Thus, the plug member is engaged to the selectable one of the plurality of openings in the base member.

The inflatable decoy generally includes an inflation tube 34 extending between the decoy opening and a main portion of the inflatable decoy. The inflation tubes includes a flange 36 extending from an outer surface. The flange is positionable inside the base member when the decoy opening is inserted through the associated opening in the base member. Thus, the inflatable decoy is coupled to the base member.

The flange also includes an angled surface generally facing a distal end of the inflation tube relative to the main portion of the inflatable decoy. The angled surface facilitates the insertion of the flange into the base member.

The base member further includes a plurality of anchoring 26 straps coupled to the base member. The anchoring straps are designed for coupling to an anchoring member 27 for holding the base member in a static position.

The base member also includes a plurality of tie straps 28 extending from an end of the base member. The tie straps are engageable to each other when the base member is rolled up from a second end of the base member. Thus, the base member is holdable in a rolled position 50 for facilitating storage of the base member.

The base member still further includes a plurality of anchoring loops 29. Each of the anchoring loops is coupled to an associated corner of the base member. The anchoring loops facilitate the anchoring of the associated corner of the base member in a static position.

Figure 5:
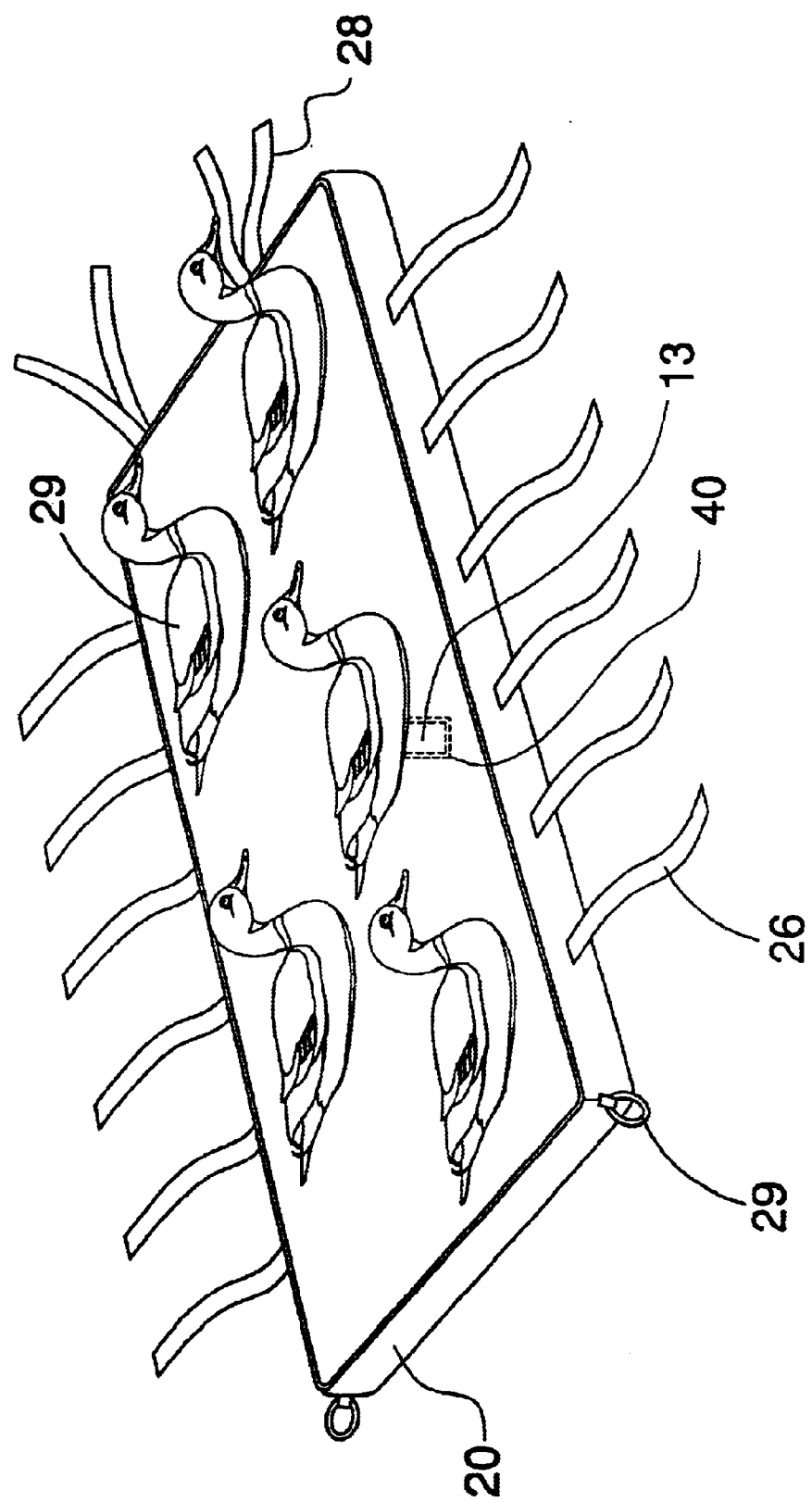
FIG. 5 is a perspective view of the present invention.

There exist a plurality of alternate decoys 39 as seen in a comparison of FIGS. 1 and 5. Each of the alternate decoys includes a peg portion 13 extending from the base of the alternate decoy as seen in FIG. 5. The peg portion is insertable through the open top of a selectable one of the plug members for coupling the alternate decoy to the base member such that the peg portion resides in the plug member.

In use, the inflatable decoy system allows a hunter to easily deploy and retrieve the decoys. Once in the field, a hunter can unroll the inflatable decoy system by untieing several tie straps that are used to keep the system in a tied position.

The decoys, already attached to the base, allow the hunter to place all the decoys in a single step. Once the decoys are in position, the hunter may secure the inflatable decoy system to the ground or marsh by using stakes. By staking the inflatable decoy system to the ground or marsh, it allows the hunter to ensure the location of the decoy system.

Once the inflatable decoy system is staked, the hunter may inflate the decoy system through the inflation port using a conventional air pump. Since the base of the system and the decoys are fluidly interconnected, the hunter can inflate the base and the geese at the same time.

If a hunter determines that another type of fowl is present, the hunter may easily switch between decoys or mix decoys as desired. To switch the decoys, the hunter has merely to pull up on the existing decoy and insert the new decoy. Once the new decoy is inserted, the hunter may then inflate the inflatable decoy system until the new decoys are inflated. Additionally, since the base member has plugs preventing air loss when a decoy is not inserted into the system, a hunter may arrange the decoys in a number of formations.

Once the hunter decides to leave for the day, the hunter can release the air out of the inflatable decoy system using the inflation port. Once deflated, the hunter may roll up the system with the decoys attached. When the inflatable decoy system is completely rolled up the hunter can secure the roll with attached tie straps. The rolled up position of the inflatable decoy system allows the hunter to more easily carry and store the decoy system until the next hunting adventure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An inflatable decoy system comprising:

a base member, said base member being inflatable;

a plurality of openings in said base member;

a plurality of inflatable decoys, each inflatable decoy having a decoy opening couplable to an associated one of said plurality of openings of said base member such that an interior of each said inflatable decoy is in environmental communication with an interior of said base member whereby each said inflatable decoy is inflated when said base member is inflated;

an inflation port in said base member for facilitating inflation of said base member;

a plurality of plug members, each plug member being couplable to a selectable one of said plurality of openings for permitting inflation of said base member when said associated inflatable decoy is disengaged from said selectable one of said plurality of openings in said base member;

each plug member being generally cylindrical with a closed bottom and an open top;

each plug member having a first lip extending outwardly from the top of said plug member and a second lip positioned substantially parallel to said first lip and in spaced relationship to said first lip such that a perimeter edge of said selectable one of said plurality of openings is insertable between said first lip and said second lip whereby said plug member is engaged to said selectable one of said plurality of openings in said base member;

each inflatable decoy having an inflation tube extending from said decoy opening;

a flange extending from an outer surface of each said inflation tube, said flange being positionable inside said base member when said inflation tube is inserted through said associated opening in said base member whereby said inflatable decoy is coupled to said base member;

said flange having an angled surface generally facing a distal end of said inflation tube relative to a main portion of said inflatable decoy for facilitating insertion of said flange into said base member;

a plurality of anchoring straps coupled to said base member, each of said anchoring straps being adapted for coupling to an anchoring member for holding said base member in a static position;

a plurality of tie straps extending from an end of said base member, said tie straps being engageable to each other when said base member is rolled up from the other end of said base member whereby said base member is holdable in a rolled position for facilitating storage of said base member;

a plurality of anchoring loops, each anchoring loop being coupled to an associated corner of said base member for facilitating anchoring of said associated corner of said base member for facilitating holding of said base member in a static position; and a plurality of alternate decoys, each alternate decoy having a peg portion extending from a base of said alternate decoy, said peg portion being insertable through said open top of a selectable one of said plug members for coupling said alternate decoy to said base member.

\* \* \* \* \*